(12) United States Patent
Gueh

(10) Patent No.: US 8,721,750 B2
(45) Date of Patent: *May 13, 2014

(54) HYDROCARBON SYNTHESIS AND PRODUCTION ONBOARD A MARINE SYSTEM USING VARIED FEEDSTOCK

(76) Inventor: How Kiap Gueh, Singapore (SG)

( * ) Notice: Subject to any disclaimer, the term of this patent is extended or adjusted under 35 U.S.C. 154(b) by 575 days.

This patent is subject to a terminal disclaimer.

(21) Appl. No.: 12/920,046

(22) PCT Filed: Feb. 27, 2009

(86) PCT No.: PCT/SG2009/000071
§ 371 (c)(1),
(2), (4) Date: Aug. 27, 2010

(87) PCT Pub. No.: WO2009/108131
PCT Pub. Date: Sep. 3, 2009

(65) Prior Publication Data
US 2011/0009498 A1 Jan. 13, 2011

(30) Foreign Application Priority Data
Feb. 29, 2008 (SG) ................. 200801760-0

(51) Int. Cl.
*C01B 3/00* (2006.01)
*C01B 6/24* (2006.01)
*C10J 3/46* (2006.01)

(52) U.S. Cl.
USPC ............. 48/197 R; 48/210; 48/61; 423/644; 423/648.1; 423/650

(58) Field of Classification Search
USPC ............................................. 48/61
See application file for complete search history.

(56) References Cited

U.S. PATENT DOCUMENTS

| | | | |
|---|---|---|---|
| 5,487,640 A * | 1/1996 | Shaffer | 415/119 |
| 5,950,732 A * | 9/1999 | Agee et al. | 166/354 |
| 6,225,358 B1 | 5/2001 | Kennedy | |
| 6,262,131 B1 | 7/2001 | Arcuri et al. | |
| 6,277,894 B1 | 8/2001 | Agee et al. | |
| 6,797,243 B2 | 9/2004 | Arcuri et al. | |
| 2005/0106086 A1 | 5/2005 | Tomlinson et al. | |
| 2006/0189702 A1 | 8/2006 | Tomlinson et al. | |
| 2007/0256360 A1* | 11/2007 | Kindig et al. | 48/197 A |

* cited by examiner

*Primary Examiner* — Matthew Merkling
(74) *Attorney, Agent, or Firm* — Edwin D. Schindler

(57) ABSTRACT

A process for producing hydrocarbon products onboard a marine vessel for carbonaceous feedstock includes the steps gasification of the feedstock in a thermal conversion plant connected to an onboard power plant and forming hydrocarbons in a chemical reaction plant.

8 Claims, 1 Drawing Sheet

HYDROCARBON SYNTHESIS AND PRODUCTION ONBOARD A MARINE SYSTEM USING VARIED FEEDSTOCK

FIELD OF THE INVENTION

The present invention relates to marine systems and/or marine vessels equipped with a plant to produce synthetic fuels and/or hydrocarbon products from a carbon containing feedstock (also known as carbonaceous feedstock).

In the present invention, first a molten metal is deployed to conduct gasification of a feedstock into a syngas, and the syngas is then passed into a second reaction where a catalyst is used to convert the syngas into a hydrocarbon product.

In the second reaction, a Fischer-Tropsch reactor may be deployed.

In the first step, the molten metal is deployed as the primary process to conduct gasification of the feedstock into the syngas.

BACKGROUND OF THE INVENTION

Currently, there is an unprecedented global demand for energy for industrial and economic development in several high growth regions of the world, and this demand has exceeded in many instances the total capacity of production of fossil-derived energy sources including crude, natural gas, and coal.

When alternative energy sources are factored into the energy supply/demand equilibrium, that is, nuclear, biomass, wind, solar, geothermal and hydro derived energy pools, it is still possible that demand exceeds production capacity. Fossil energy sources are now increasingly explored and mined in far-flung regions that is substantially further away from its demand markets, and in some circumstances, these energy sources are discovered in regions where overall operating environments may be difficult. In the field of natural gas exploration and development, substantial technology has been developed for gas liquefaction to convert natural gas into denser liquefied natural gas (LNG), or directly into hydrocarbons that is easier to transport using marine vessels.

These hydrocarbons may include methanol, light olefins, gasoline, diesel, heavy wax fuels etc. Upstream technologies developed for the oil industry include marine vessels offshore oil rigs, submersible platforms, etc. that can drill to depths that was not possible just one decade ago, and various downstream technologies such as dedicated (floating production storage and offloading) (FPSO) vessels that can perform a variety of refinery and storage functions.

While the energy environment remains competitive and at times challenging, great potential can be found in still unexplored areas of the world include the Arctic/polar regions where undiscovered oil and gas reserves are estimated at 25% of total world supplies. Significant developments have also been made in the areas of tar sands and shale oil recovery to yield syncrude (synthetic crude).

Additionally, a gradual realization of an apparent acceleration of rising temperatures in almost every major part of the world have convinced many that the continued use and subsequent pollution of heat trapping gases such as carbon dioxide ($CO_2$) cannot be reasonably sustained without dramatic implementation of technologies in the area of environmental regulation, emissions control, carbon sequestration/storage, and simply using fuels that are derived from renewable resources.

It is now estimated that a small elevation in global median temperatures can trigger varying amounts of flooding and sea level readjustments especially to coastal regions, and with large number of urban population centers also located at these places, along with their industrial infrastructure including power generation, transport, factories and manufacturing plants, this presents a potentially massive shift in locating these critical facets of the industrialized states to locations where the mentioned effects are less pronounced.

Marine vessels ranging from container ships that can travel between continents and vast distances to maritime vessels that are simply moored or anchored to body of water, such as storage platforms or ships that can function of depositories for energy assets such as crude oil, or to conduct drilling of energy reserves found deep within the depths of the sea. In addition to ships that either perform transportation of energy, there are vessels that can drill and extract energy, and further "production" vessels that can convert the extracted energy such as natural gas, into denser or more suitable forms, such as methanol, LNG, etc.

Molten metal, especially molten iron, molten metal melts, baths are well known and are used as gasifiers. High temperatures in such baths rapidly decompose, by thermal action, a variety of solid, liquid and gaseous feedstock into hydrogen and/or carbon oxides—the gas product is also known as syngas, comprising hydrogen and carbon oxides (mainly CO).

Such a molten metal gasification system, if operated on terrestrial land, would require large quantities of cooling water, and in some cases, availability of cooling water can result in operational failure or safety hazards if operating temperatures are not properly regulated. Economically, a cooling system on such a terrestrial gasification system may offset any cost savings in its advantages (compact, efficient, etc).

Depending on the quality and composition of the feedstock, the syngas produced from conducting gasification of feedstock in the molten metal may be varied, and will cause operational problems in developing an optimal hydrocarbon product from its second stage catalyst reaction.

Additional and very large quantities of hydrogen, such as those present in water or ambient air, may be required for proper gasification and production of syngas.

In this case, the operation of the molten melt gasifier may require large quantities of water or air either in a steady flow rate or in periodical time blocks, especially in the operation of the containment vessel since temperature regulation is required for safe and reliable performance.

Further, due to the large amounts of electrical energy required for starting and maintaining molten metal, cost of energy may vary due to cost of energy generation. For example, cost of energy production on a marine vessel may be lower than that of producing the energy on land, depending on the fuel source.

In one of the most troubling aspect of locating a high cost plant in a particular territorial domain is the potential of riots, possibility of nationalization of plant assets, and problems of shipping end product to multiple end users within a suitable schedule.

COMMON TERMS

For purposes of this specification and claims the following shall mean:

Marine vessel, marine system, marine vehicle

Refers to any floatation structure, vehicle, platform, and/or offshore platform. Could be operated in seawater, freshwater, or both. Usually referred to as a ship, ocean-going vessel, barge, hull-vessel, hull, tanker, cargo ship, very large crude carrier (VLCC), floating production, storage and off-loading vessel (FPSO), offshore platforms (semi-submersible, submersible, "rigs") are included in this definition of marine vessel or vessel. Submarines are further included in the definition as same as the term "submersible platform" or vessel.

Gasification Or Pyrolysis

Refers to any thermal heating action or process acting on a material to yield gas blend containing elements originally present in the material prior to thermal heating action. In materials containing carbon and moisture, carbon monoxide and hydrogen is produced from this thermal heating action. This gas mixture of carbon monoxide (CO), hydrogen ($H_2$) (along with other gases such as carbon dioxide etc.) is commonly known as "syngas". Generally, a carbonaceous material/feedstock can be converted by thermal means into a syngas blend. Gasification/pyrolysis can be interchangeably used to describe the process of converting the feedstock into the syngas.

Carbonaceous Feedstock Or Feedstock

Refers to any material containing some carbon. Material, or feedstock, may be in any form and can be either naturally occurring, or a synthetic material, or both, most forms of matter such as solids, liquids and gases are included in the term feedstock or material or carbonaceous material or carbonaceous feedstock. Biomass, municipal waste, municipal solid waste (MSW), scrap waste material, sludge, marine sludge, waste oil, waste sludge, scrap metal, wood, coal, lignite, waste coal, carbon black, rubber, scrap rubber material, rubber derived material, wood chips, charcoal, glass, paper, refuse derived waste, refused derived fuel (RDF), sand, soil material, granular particles, tar sands, shale oil, peat, natural gas, petroleum, crude oil, oil wax, sewage, grass, agriculture derived waste, animal derived waste, are all considered as part of this definition of carbonaceous feedstock.

Hydrocarbon Or Hydrocarbon Product

Refers to a hydrocarbon product comprising a carbon number of between $C_1$ to $C_4$, or $C_5$ to $C_{10}$, or $C_{11}$ to $C_{20}$, $C_{21}$ to $C_{30}$, or $C_{31}$ to $C_{60}$, further includes carbon-based fuels comprising a carbon number of between $C_1$ to $C_4$, or $C_5$ to $C_{10}$, or $C_{11}$ to $C_{20}$, $C_{21}$ to $C_{30}$, or $C_{31}$ to $C_{60}$, further includes gasoline, diesel, kerosene, methane, ethane, propane, butane, synthetic natural gas, methanol, light olefins, oxo-alcohols, ethanol.

Fischer-Tropsch Hydrocarbon Products

Refers to a hydrocarbon product comprising a carbon number of between $C_1$ to $C_4$, or $C_5$ to $C_{10}$, or $C_{11}$ to $C_{20}$, $C_{21}$ to $C_{30}$, or $C_{31}$ to $C_{60}$, further includes carbon-based fuels comprising a carbon number of between $C_1$ to $C_4$, or $C_5$ to $C_{10}$, or $C_{11}$ to $C_{20}$, $C_{21}$ to $C_{30}$, or $C_{31}$ to $C_{60}$, further includes gasoline, diesel, kerosene, methane, ethane, propane, butane, synthetic natural gas, methanol, light olefins, oxo-alcohols, ethanol.

Fischer-Tropsch Reactor

Refers to a system that is equipped onboard a marine vessel to perform the conversion, or forming of a predetermined hydrocarbon product from a Syngas blend. The chemical reaction unit is in communication or operationally connected with the thermal conversion plant. Conversion process may or may not make use of a catalyst material or medium to aid in the conversion process to hydrocarbon. Fischer-Tropsch reactor also refers to a methanation reactor, which converts syngas into a hydrocarbon product comprising methane.

Syngas Or Syn-Gas Or Synthetic Gas

Refers to any gas blend comprising of carbon monoxide (CO) and hydrogen ($H_2$), and may further contain some portion of carbon dioxide ($CO_2$) and other elements. Syngas has a heating value of between 75 to 350 BTU per cubic foot—however, BTU values will vary and may exceed the given range depending on gas element composition ratio.

Electric Power Or Electric Current

Refers to a supply of voltage (or electric energy) and can include direct current (DC) or alternating current (AC) power. Voltage may further comprise of a particular voltage phase.

Vessel Powerplant

Refers to the prime mover device or system or engine of the vessel (marine vessel), usually responsible for supplying propulsion power to the vessel, and may feature a mechanical system (sometimes known as a marine drive) coupling the engine to the propeller shaft. For marine vessels without a propeller driven propulsion, the marine drive would be the interface wherein energy generated from the powerplant is converted into propulsion for the vessel.

Powerplant

Refers to any power generating device or system. The device or system may produce mechanical power, or electric power, or both, depending on the type of powerplant. Includes reciprocating piston engines, gas turbines, steam turbines, auxiliary generator units, fuel cells, a battery system, rotary engines, combustion boiler that is coupled with an energy conversion apparatus (such as a steam turbine).

Thermal Conversion Plant

Refers to a system that is equipped onboard a marine vessel to perform the conversion of a carbonaceous feedstock into a syngas blend comprising CO and $H_2$, the thermal conversion plant may be in communication or operationally connected with a variety of parts and sub-systems of the marine vessel, or other related plant system of the overall process of the present invention. The thermal conversion plant uses mainly thermal energy to cause the conversion process, either by convection, radiation, conduction, or a combination thereof.

Chemical Reaction Unit/Chemical Reaction Plant

Refers to a system that is equipped onboard a marine vessel to perform the conversion, or forming of a predetermined hydrocarbon product from a syngas blend. The chemical reaction unit is in communication or operationally connected with the thermal conversion plant. Conversion process may or may not make use of a catalyst material or medium to aid in the conversion process to hydrocarbon.

SUMMARY OF THE INVENTION

The present invention provides a process of manufacture and distributing a hydrocarbon product to at least one remote site, using a marine vessel wherein manufacturing and distributing are implemented onboard.

A marine vessel, such as a suitably adapted floatation vehicle performs intake and loading of a carbonaceous feedstock up to a predetermined load tonnage, from a first remote site, which may be a port terminal facility, a second marine vessel, or a flotation terminal/structure such as an offshore platform, or a land-based/terrestrial facility.

The feedstock may be pre-treated including reducing or increasing its moisture content, either by heat drying (reducing moisture), or fluid spraying or steaming (increasing moisture).

The feedstock may also be reduced in physical size by means of a grinder device, or be pulverized into a suitable sieve size. The reduction of the feedstock will enlarge surface area that can be converted into a syngas blend during conversion stage in the thermal conversion plant.

The pre-treated feedstock is then passed into the thermal conversion plant to allow for the feedstock to be thermally converted into a syngas blend comprising CO and $H_2$, however, the syngas blend may further comprise of additional gases such as $CO_2$ etc, depending on the proximate/ultimate analysis and composition of the feedstock used. (The present invention may use a mixture of different feedstock types depending on the location where the feedstock is collected for conversion).

The syngas blend may undergo a gas "clean-up" stage where the additional gases are removed to an acceptable level, and passed into the chemical reaction unit/plant, where the syngas is converted into a hydrocarbon product, commonly with the aid of a catalyst.

The choice of catalyst, reaction pressure, residency time in the reaction unit, temperature of the syngas feed-stream will determine the hydrocarbon formation of a particular molecular weight. The hydrocarbon product is then isolated, or collected for storage onboard the vessel, which is then subsequently delivered and distributed to a remote site.

The marine vessel is simultaneously performing delivery of the predetermined product to a remote site while converting the carbonaceous feedstock into the said product using the onboard thermal conversion plant, the chemical reaction unit and the marine vessel's system.

PRIOR ART

U.S. Pat. No. 6,262,131
U.S. Pat. No. 6,225,358
U.S. Pat. No. 6,277,894
U.S. Pat. No. 6,797,243
U.S. Patent Application 2006/0189702
U.S. Patent Application 2005/0106086

BRIEF DESCRIPTION OF THE DRAWINGS

Illustrative preferred embodiments of the present invention will now be described, by way of example, with reference to the accompanying drawings, in which.

DETAILED DESCRIPTION OF THE PREFERRED EMBODIMENTS

Figure 1:
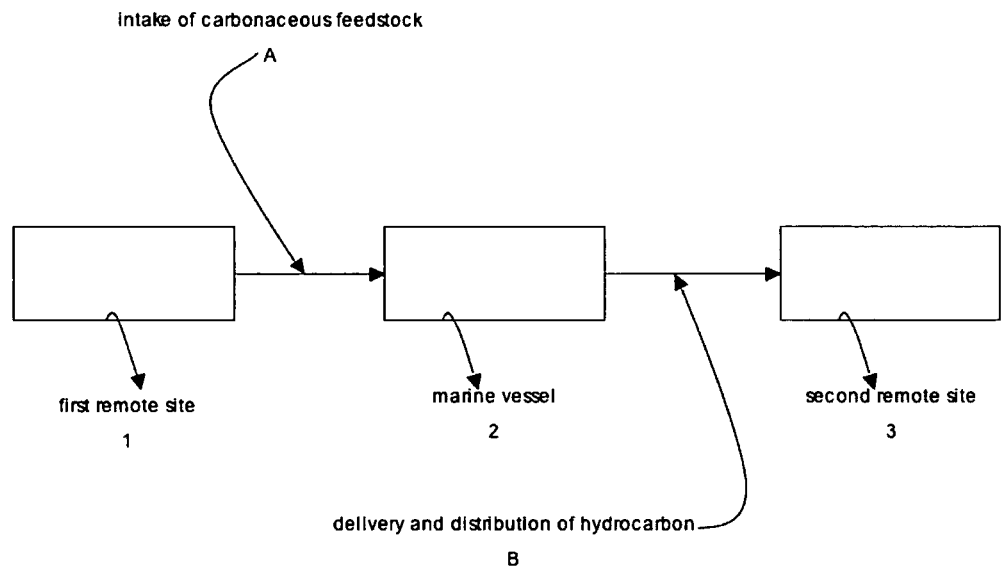
FIG. 1 depicts a schematic of a preferred embodiment of the present invention comprising a marine vessel, a first remote site and a second remote site. The marine vessel performs intake of a carbonaceous feedstock from the first remote site into the vessel, and converts the feedstock into a syngas blend comprising CO and $H_2$, and then converting syngas into a predetermined hydrocarbon product that is delivered and distributed to the second remote site.

With reference to FIG. 1, a marine vessel (2) performs intake and loading of a carbonaceous feedstock (A), from a first remote site (1).

The first remote site (1) may be a land-based terrestrial facility, or a second marine vessel, or an offshore platform, or a floating terminal platform.

Once the feedstock (A) is completely and satisfactorily loaded onto the vessel (2), it begins its journey to a designated second remote site (3).

The vessel (2) will also simultaneously convert the carbonaceous feedstock (A) into a hydrocarbon product (B), which is delivered and distributed to the second mote site (3).

The vessel (2) may conduct a second intake of additional carbonaceous feedstock (A) from the second remote site (3), to replenish the feedstock (A) that is consumed to produce the hydrocarbon product (B).

Additionally, the marine vessel (2) may also conduct replenishment of the feedstock (A) while at the same time, distributing the hydrocarbon product (B) to the second remote site (3).

Figure 2:
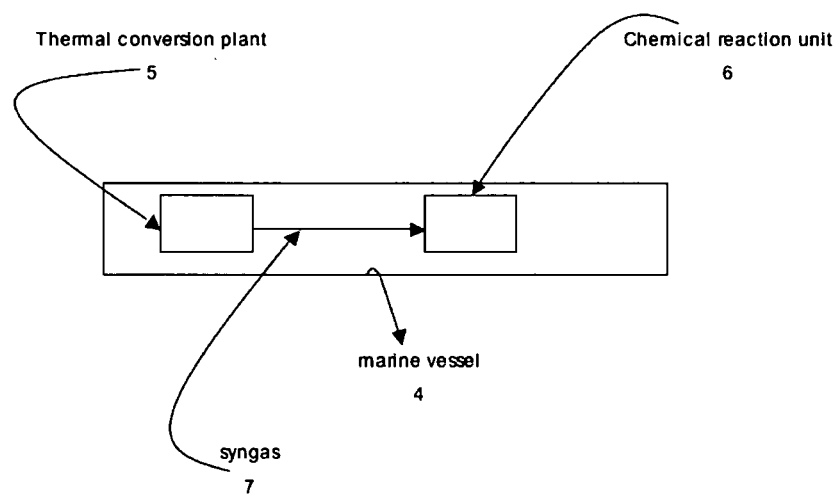
FIG. 2 depicts a schematic of a preferred embodiment of the present invention comprising a marine vessel, the vessel further comprising at least one thermal conversion plant, and at least one chemical reaction unit. The thermal conversion plant converts the carbonaceous feedstock into a syngas blend comprising CO and $H_2$; the chemical reaction unit converts the syngas into a predetermined hydrocarbon product.

With reference to FIG. 1 and FIG. 2, a marine vessel (4) converts a carbonaceous feedstock (A) into a hydrocarbon product (B), by sending the feedstock (A) into the thermal conversion plant (5), and converting the feedstock (A) into a syngas (7), this syngas (7), comprises CO, $H_2$, and is an industrially valuable product by itself. The syngas (7) is passed into a chemical reaction unit (6), to convert the syngas (7) into the hydrocarbon product (B).

In a process for the production of hydrocarbon products onboard a marine vessel, from at least one gas, liquid or solid, carbonaceous feedstock, the improvement comprising conducting gasification in a thermal conversion plant operationally connected to an onboard powerplant unit and forming the hydrocarbons in a chemical reaction plant, the thermal conversion plant sending a gas stream intermediate product from the thermal conversion plant to the chemical reaction plant, wherein the gas stream intermediate product comprises CO and $H_2$ gas.

The above process, wherein the thermal conversion plant comprises of a containment device and holding a molten metallic material, and the carbonaceous feedstock is fed into contact with the molten material in a predetermined manner to conduct gasification of the feedstock into a gas stream intermediate product, wherein the chemical reaction plant is adapted with a heat recovery system and said system recovers heat generated from the chemical reaction plant.

The above process, wherein the heat recovery system is operationally connected to the marine vessel powerplant and heat generated from the heat recovery system is deployed to provide propulsion power for the said marine vessel.

The above, wherein the chemical reaction plant is a Fischer-Tropsch reactor.

In the above preferred embodiment of the present invention, a marine vessel, such as a ship, barge, offshore platform, flotation platform, or specialized vessel like a FPSO, has operational means to perform intake of a feedstock material, and this feedstock material can be varied and diverse, and can include materials such as fossil related material, for example, brown coal, crushed coal, or uncrushed coal, crude oil, heavy oil, waste lubrication oil, waste oil or oil-like material, waste marine oil sludge, tar sands, and also includes non-fossil material feedstock such as soil material, garbage, municipal waste, biomass derived material such as grasses, waste agricultural discharge, sewage waste, wood, wood chips, wood derived waste, scrap rubber material, used rubber material, used rubber tires, sea-weed material, animal waste, agricultural waste, palm oil waste effluent, and can also include other materials such as peat, dried grass, unprocessed grass, raw sewage material, top-soil or soil-like sediments, shale oil material, raw natural gas, and any other material containing some value of carbon, hydrogen, or compounds containing carbon, hydrogen.

This feedstock material is stored onboard the vessel and is fed into a pre-processing plant, although some materials such as waste wood chips may be directly fed into the gasification reactor of the present invention.

The gasification reactor onboard the vessel is also known as the thermal conversion plant, and has a containment vessel that holds a charge metal, the thermal conversion plant then converts the charge metal into a molten metal melt or molten metallic material.

The charge metal may be steel, iron, metal alloy, mixed scrap metals, zinc, lead, or any other metal that can be subjected to heating or thermal action to cause the metal to be turned into a molten metal form.

The thermal conversion plant may further deploy electric arc furnace technology, induction heating, or suitably operated furnace torches to cause thermal heating and or thermal action of the charge metal into its molten form. Furnace torches may include plasma arc torches, gas torches, oxygen-fuel torches etc.

The charge metal may also be thermally treated to turn into molten metal and then transferred into the containment vessel of the thermal conversion plant.

Once the thermal conversion plant's containment vessel is filled with a molten metal, or the charge metal in the containment vessel is in its molten form, carbonaceous feedstock is introduced into the containment vessel, and subjected to the high temperature of the molten melt to cause gasification of the feedstock into an intermediate gas, known as syngas, comprising of CO (carbon monoxide), $H_2$ (hydrogen), and other by-products depending on the gasification conditions within the containment vessel and quality of the feedstock.

The feedstock may be introduced into thermal contact with the molten melt by feeding the feedstock below the surface of the molten melt to ensure high quality syngas production.

Once the feedstock is gasified into a syngas, the syngas is then subjected to processing such as quenching or gas cleaning or gas processing, before being further passed into a chemical reaction plant that converts the syngas into a specified or determined hydrocarbon product, such as methane gas, or other higher carbon number hydrocarbon product.

Syngas conversion into various hydrocarbon products are well known in the prior art. Useful and industrially valuable products can be derived from a syngas depending on the catalyst, design and operating condition of the chemical reaction plant.

One type of chemical reaction plant is a Fischer-Tropsch reactor, during which this part of the present invention generates a fair amount of heat when syngas is chemically converted by the reactor's catalyst into a specified hydrocarbon product.

The heat generated by the Fischer-Tropsch reactor is suitably captured by means of a heat exchanger device and the captured heat is further deployed for conversion into mechanical energy, which is utilized for the propulsion requirements of the marine vessel.

The heat exchanger device may feature a heat exchanger bank where heat from the reactor is transferred to a primary heat exchanger bank, and the primary exchanger bank in turn converts a working fluid in a secondary exchanger bank into pressurized state, in order to operate and run a turbine.

This turbine may additionally be coupled to a generator unit for production of electrical power for onboard consumption/use.

The heat exchanger device may also be known as a heat recovery unit/system.

The marine vessel may be either moored or anchored in an approximate position, or be in motion and in process of its journey from its starting location to a intended destination, such as an unloading terminal, port, unloading facility, another marine vessel, or another offshore platform.

The marine vessel may perform its entire gasification process or process steps above while in transit or performing its journey to its intended destination.

Further in another preferred embodiment of the present invention, it provides a process for producing a hydrocarbon product from a carbonaceous feedstock the process is implemented onboard a marine vessel, and the marine vessel subsequently distributing the hydrocarbon product to at least one remote site, comprising:

having a predetermined mass of metal onboard a marine vessel,
heating the metal mass into a molten metal,
holding the molten metal in a containment vessel,
introducing a carbonaceous feedstock into contact with the molten metal,
producing and yielding an intermediate gas stream from the molten metal,
collecting the intermediate gas stream and subjecting it to a chemical catalytic reaction to yield a predetermined hydrocarbon product,
collecting thermal heat generated by the chemical catalytic reaction to a heat recovery system,
the heat recovery system generating energy for use by the marine vessel,
collecting the hydrocarbon product onboard the marine vessel,
distributing the product to at least one remote site Further in another preferred embodiment of the present invention, the invention provides a process for refining a hydrocarbon feedstock into a refined hydrocarbon product the process implemented onboard a marine vessel, and the marine vessel subsequently distributing the hydrocarbon product to at least one remote site.

The process above, wherein the feedstock is converted into an intermediate gas stream by introducing the feedstock into contact with a molten metal mass in a containment vessel onboard the marine vessel.

The process above, wherein the intermediate gas stream is collected from the containment vessel and subjected to a catalyst reaction to yield a pre-determined hydrocarbon product.

The process above, wherein the intermediate gas stream contains at least CO and $H_2$.

The process above, wherein the catalyst reaction generates heat during conversion from the intermediate gas stream into the hydrocarbon product.

The process above, wherein the catalyst reaction generated heat is captured in a heat recovery device.

The process above, wherein the heat recovery device generates energy from captured heat to make available for use onboard the marine vessel.

The process above, wherein the heat recovery device generates energy for the marine vessel's propulsion.

The process above, wherein the heat recovery device generates energy for the marine vessel's auxiliary electrical power.

In this preferred embodiment of the present invention, the feedstock may be crude oil or heavy wax, where the feedstock is introduced into the molten melt to produce gasified syngas, which is further deployed in a chemical reaction plant (one constructed with a suitable reaction catalyst) to convert the syngas into a hydrocarbon and refined product. Associated metals and impurities present in the feedstock such as sulphur is substantially removed at the stage where the feedstock is introduced into the molten metal melt within the containment vessel.

While the invention has been particularly shown and described with reference to a preferred embodiment, those skilled in the art will understand that various changes in form and detail may be made without departing from the spirit and scope of the invention.

The invention claimed is:

1. In a process for producing hydrocarbon products onboard a marine vessel, from at least one gas, liquid or solid, carbonaceous feedstock, the improvement comprising the steps of:
    conducting gasification in a thermal conversion plant, the thermal conversion plant being operationally connected to an onboard power plant unit, the thermal conversion plant comprising induction heating and a containment vessel holding a charge metal, the onboard power plant unit comprising a turbine for providing electric power, wherein gasification comprises the sub-step of using the electric power from the turbine for the induction heating;
    forming a hydrocarbon product in a chemical reaction plant;
    sending a gas stream intermediate product from the thermal conversion plant to the chemical reaction plant,
    recovering heat generated from the chemical reaction plant via a heat recovery system connected to said onboard power plant unit of said marine vessel; and,
    propelling said marine vessel using the heat generated from said heat recovery system having a heat exchanger bank for generating energy for providing propulsion power for said marine vessel,
    wherein heat recovery comprises the sub-step of converting a work fluid in the heat exchange bank of said heat recovery system into a pressurized state for miming the turbine, and
    wherein the energy for the induction heating and for the propulsion power for said marine vessel is provided by the same said turbine.

2. The process for producing hydrocarbon products onboard a marine vessel according to claim 1, wherein the gas stream intermediate product comprises CO and $H_2$ gas.

3. The process for producing hydrocarbon products onboard a marine vessel according to claim 1, wherein the thermal conversion plant includes a containment device and holding a molten metallic material, and the carbonaceous feedstock is fed into contact with the molten material for conducting gasification of the feedstock into a gas stream intermediate product.

4. The process for producing hydrocarbon products onboard a marine vessel according to claim 1, wherein the chemical reaction plant is a Fischer-Tropsch reactor.

5. The process for producing hydrocarbon products onboard a marine vessel according to claim 1, wherein the chemical reaction plant is a methanation reactor.

6. A process for producing a hydrocarbon product from a carbonaceous feedstock implemented onboard a marine vessel, and the marine vessel subsequently distributing the hydrocarbon product to at least one remote site, comprising the steps of:
    having a predetermined mass of metal onboard a marine vessel;
    inductively heating the metal mass into a molten metal;
    providing electrical power via a turbine of an onboard power plant;
    using the electrical power of the turbine for induction heating;
    holding the molten metal in a containment vessel;
    introducing a carbonaceous feedstock into contact with the molten metal;
    producing and yielding an intermediate gas stream from the molten metal;
    collecting the intermediate gas stream;
    subjecting the intermediate gas stream to a chemical catalytic reaction for yielding a predetermined hydrocarbon product;
    collecting thermal heat generated by the chemical catalytic reaction to a heat recovery system;
    propelling said marine vessel using the heat recovered from said heat recovery system having a heat exchanger bank for generating energy for providing propulsion power for said marine vessel, wherein the heat recovery comprises the sub-step of converting a work fluid in the heat exchanger bank of said heat recovery system into a pressurized state for running the turbine, wherein the energy for the induction heating and for the propulsion power is provided by the same said turbine;
    collecting the hydrocarbon product onboard the marine vessel; and,
    distributing the hydrocarbon product to at least one remote site.

7. The process for producing a hydrocarbon product from a carbonaceous feedstock implemented onboard a marine vessel according to claim 6, wherein said heat recovery system comprises a heat exchanger having a primary heat exchanger bank and a secondary heat exchanger bank, wherein said secondary heat exchanger bank converts the work fluid into a pressurized state.

8. The process for producing hydrocarbon products onboard a marine vessel according to claim 1, wherein said heat recovery system comprises a heat exchanger having a primary heat exchanger bank and a secondary heat exchanger bank, wherein said secondary heat exchanger bank converts the work fluid into a pressurized state.

* * * * *